Sept. 21, 1948.　　　G. CLAUSING ET AL　　　2,449,878
COPYING LATHE
Filed Dec. 27, 1943　　　　　　　　　　　4 Sheets-Sheet 1

INVENTORS.
George Clausing
Charles B. Gary
BY

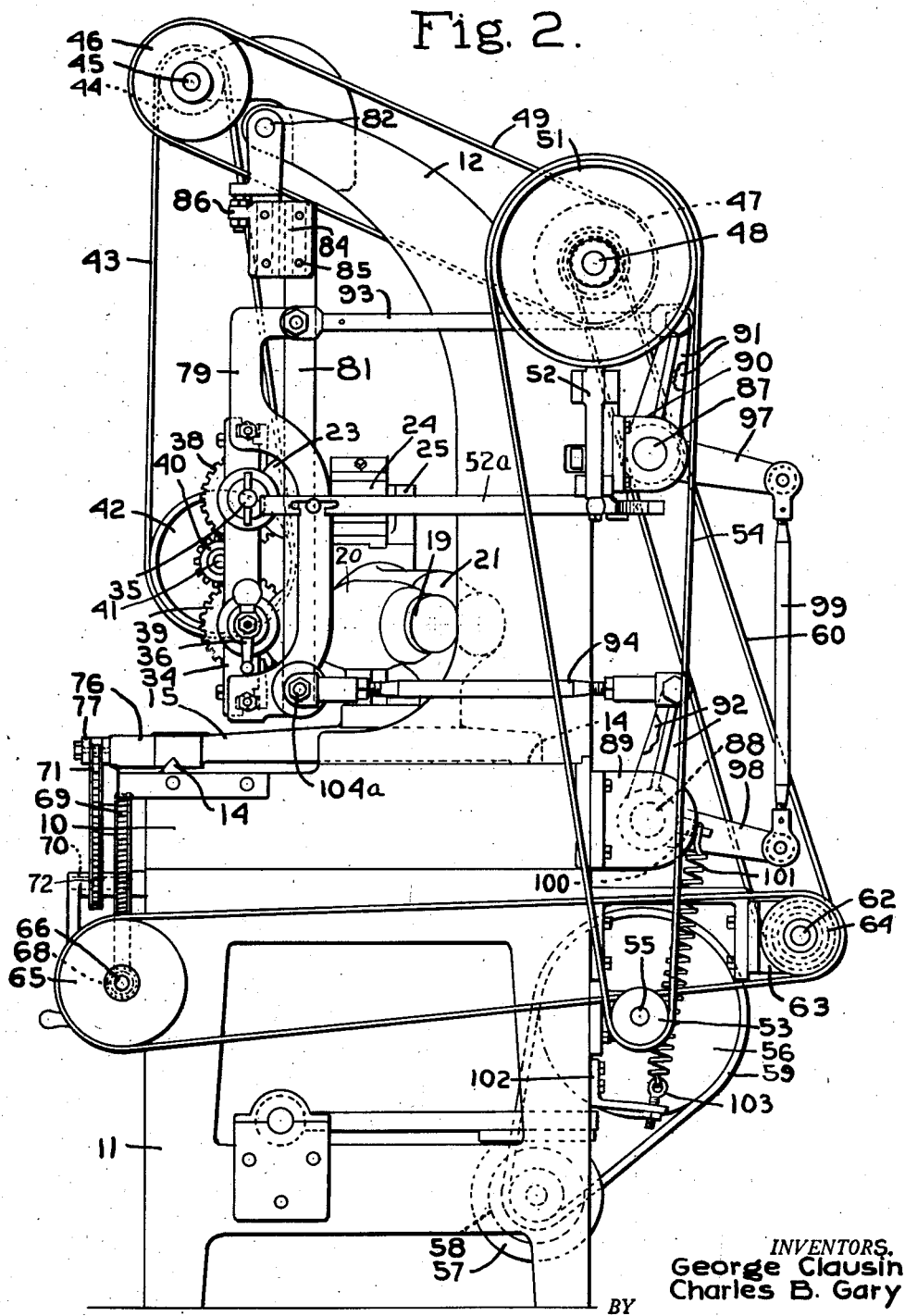

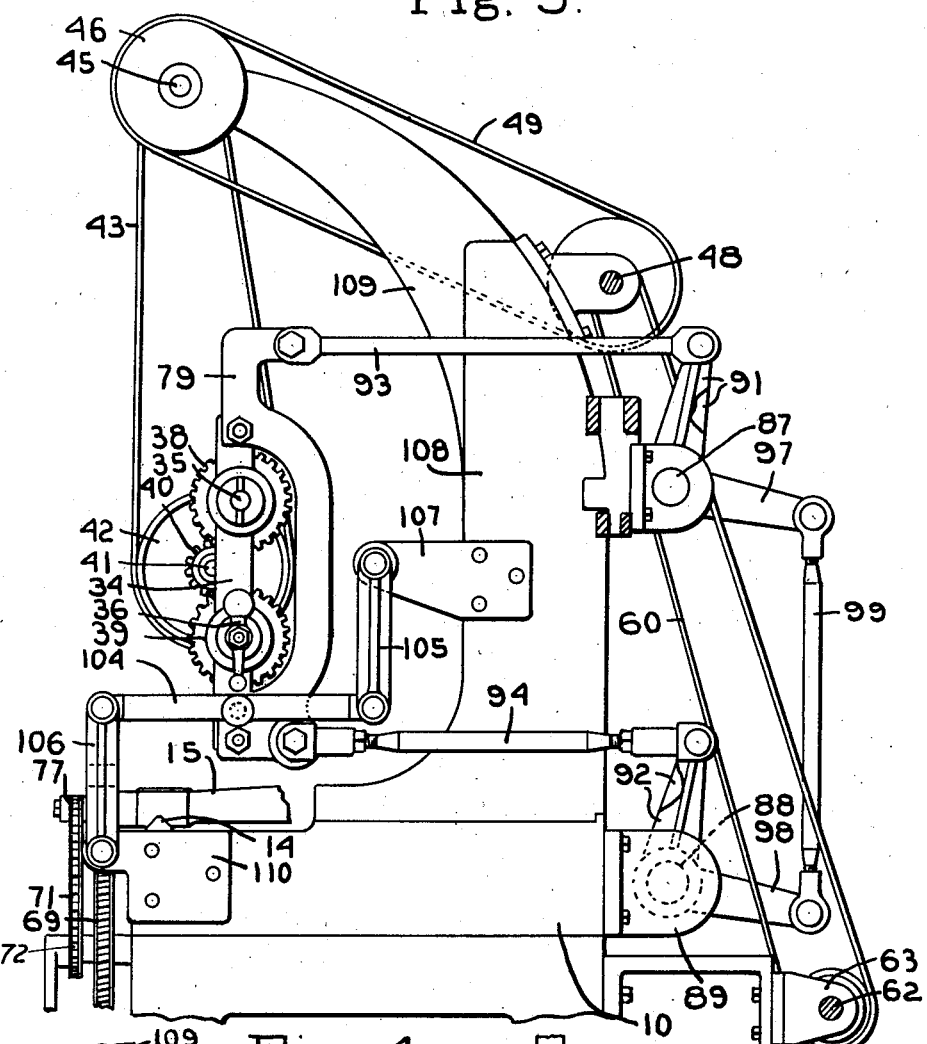
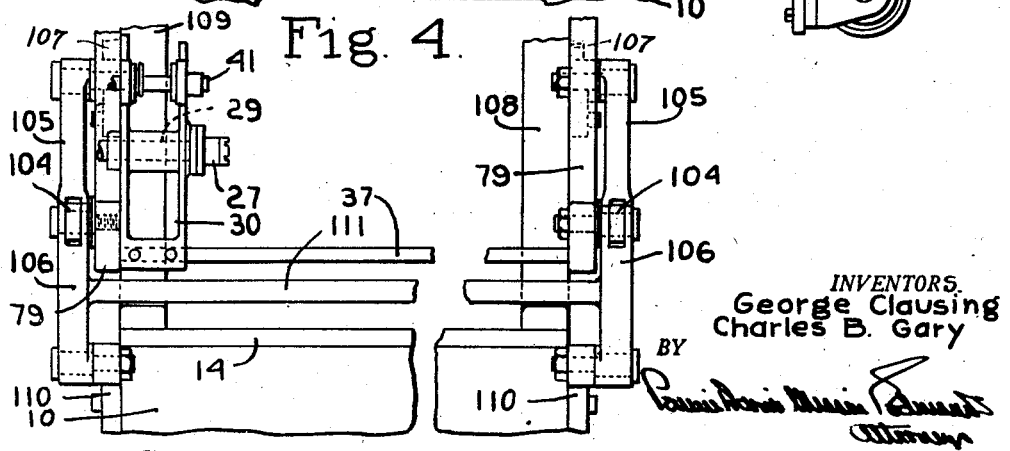

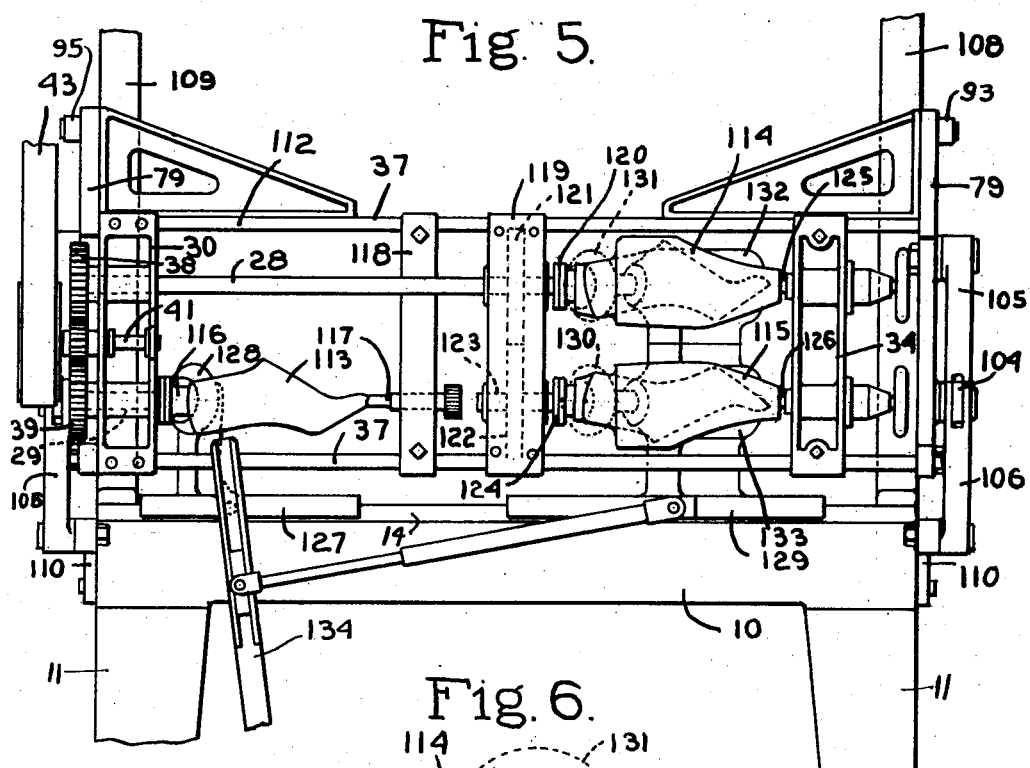
Fig. 5.
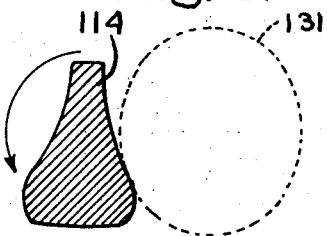
Fig. 6.
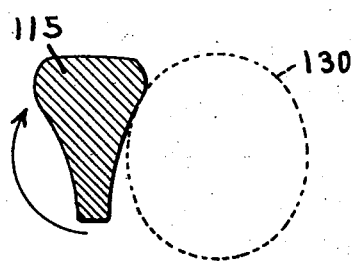

Patented Sept. 21, 1948

2,449,878

UNITED STATES PATENT OFFICE 2,449,878

COPYING LATHE

George Clausing and Charles B. Gary, Portsmouth, Ohio, assignors to Vulcan Corporation, Portsmouth, Ohio, a corporation of Ohio Application December 27, 1943, Serial No. 515,704

7 Claims. (Cl. 142—15)

This invention relates to copying lathes of the type employed to produce three dimensional objects of irregular form and is particularly directed to improvements therein relating to the means for supporting and moving the model being copied and the work piece relatively and symmetrically with respect to the coacting model wheel and cutter head.

To emphasize the features which distinguish the present invention from existing apparatus let it be pointed out that in the conventional reproducing lathe the model and workpiece are supported and moved in a frame which swings in an arc determined by its axis of suspension. Such an arrangement is in some respects satisfactory particularly when the model and workpiece are arranged in axial alignment. However, the present invention is an outstanding improvement not only over this conventional type of lathe, but for all types of three dimensional reproducing devices.

The lathe embodying the present invention is provided with a frame having means for supporting and rotating the model and means for moving and guiding the frame positively in a lateral direction and simultaneously maintaining the frame so that all positions are parallel during its movement. Such motion providing accuracy of operation of the highest order and also providing for consistent accuracy in all modifications in the arrangement of a model and one or more workpieces within the frame as will appear in the following detailed description.

Briefly the apparatus embodying the invention consists of a main frame having straight ways thereon upon which one or more carriages travel. The carriage is provided with a model wheel arranged to engage the model and a driven cutter head to engage and shape the workpiece. Suitable means is provided for feeding the carriage during the shaping operation. In the embodiments of the invention illustrated, the model and workpiece are pivotally supported with their axes parallel within a frame which will hereinafter be called the work frame.

This frame desirably is rectangular in form and generally thin presenting a flat structure lying in a plane. Desirably but not essentially the work frame is mounted with its flatwise plane in a vertical position with the axes of the model and workpiece situated one above the other within the frame. Suitable means are provided for rotating the model and workpiece in synchronism during the cutting operation.

A highly efficient and novel means is provided for guiding the frame to travel with a motion characterized as bodily movement transversely of its general flatwise plane and without angular displacement from that plane. To produce this motion the four corner portions of the rectangular frame are connected by rigid links to a stabilizing mechanism utilizing a pair of rigid torque shafts. The shafts are rotatably mounted upon the main frame of the machine in spaced parallel relation to the workframe. The two shafts are tied together to rotate in synchronism such as by means of levers secured thereto and an interconnecting link. The upper torque shaft is provided with a pair of levers each of which is connected to the upper corner portion of the workframe by rigid links while the lower shaft is similarly connected to the lower corners of the frame.

The frame is thus confined to move in the manner above defined. Its weight, however, must be supported in a suitable manner and also it is important to cause movement of the frame to follow a substantially straight path in the cutting range. The manner of producing this linear movement constitutes a feature of the invention. The support of the frame and its guidance is accomplished by utilizing a system of links thereby avoiding the use of a slide mechanism which is unavoidably inefficient and furthermore its operation is notably adversely effected by accumulated foreign manner such as chips and the like. In a linkage system all movement is achieved through pivot bearings having an exceedingly low friction coefficient and which also may readily be maintained at maximum efficiency indefinitely by conventional lubricating methods independently of the presence of dust, chips and foreign matter.

One desirable means for accomplishing the result above outlined is to support the work frame upon a pair of relatively long links pivoted at the ends of the work frame and so arranged that the motion of the frame will be practically along a straight tangent line to the points of attachment between the links and the workframe. Another mode of support for the frame is also presented wherein each end of the work frame is pivotally connected to the center of a horizontal lever while the outer ends of these levers are pivoted to one end of a pair of relatively short equal links. The other ends of the links are pivoted upon fulcrum points symmetrically situated upon the main frame above and below the horizontal lever. The frame in this structure is caused to move in a straight path.

The frame supporting linkages above described coact with the torque shafts to produce an accurate and uniform motion of the work frame but in addition to this fact the effort required to move the frame is reduced to a minimum due to the absence of excessive friction at all points in its supporting and guiding mechanism. This ease of movement insures a maximum of sensitivity in the motion of the frame not attainable heretofore, and as a result of such sensitivity the work produced is of a high degree of accuracy. Moreover the output of the apparatus may be increased because of the relatively rapid response in the movement of the work frame which permits a substantial increase in the operating speed of the lathe.

To present a better understanding of the invention, specific embodiments thereof will now be described in connection with the accompanying drawings in which:

Fig. 2 is an end elevation of the apparatus shown in Fig. 1.

Fig. 3 is an end elevation of a different embodiment of the invention.

Fig. 4 is a partial front elevation of the apparatus shown in Fig. 3.

Fig. 5 is a partial front elevation of a modified form of the invention.

Fig. 6 is a diagrammatic illustration showing the relative position of the last blocks and cutter heads shown in Fig. 5.

Figure 1:
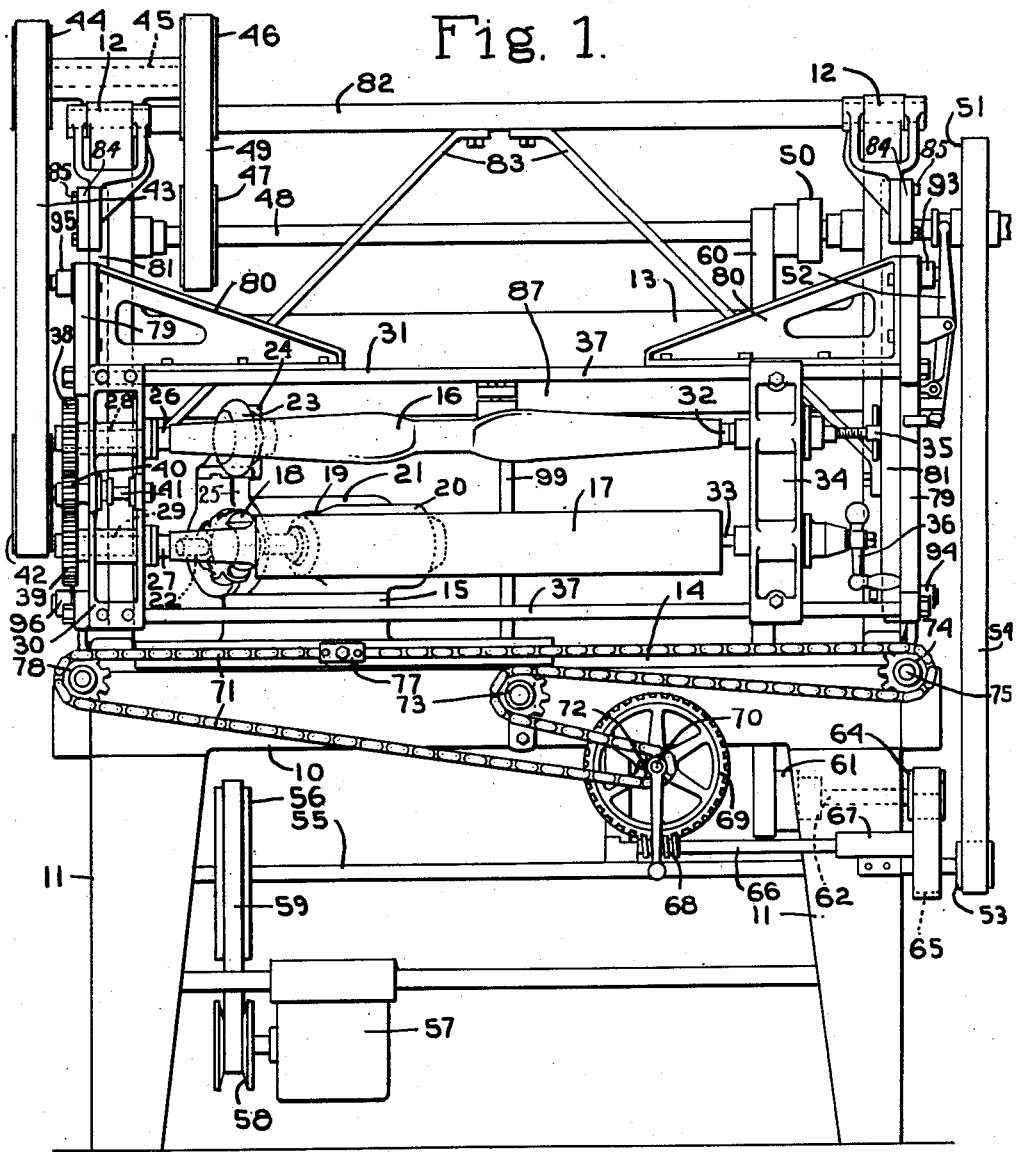
Fig. 1 is a front elevation of the apparatus.

The present invention basically provides a new type of precision three dimensional copying lathe. The manner in which the relative movements between the various elements are obtained and precisely coordinated constitutes the essence of the invention.

The main frame of the lathe is provided with a bed 10 supported by legs 11. A pair of vertical columns 12 project upwardly from the end portions of the bed and desirably are tied rigidly together by a cross bar 13. The bed 10 is provided with ways 14 extending lengthwise thereof upon which a carriage 15 travels. In the form of the invention illustrated, a model 16 and a work piece 17 are shown with their axes laterally separated and parallel. In this manner a workpiece having a length substantially equal to the full length of the lathe bed may be produced. It is within the scope of the present invention however, to provide the necessary supporting centers or dogs with their co-acting driving means to arrange a model and work piece in axial alignment. Furthermore, two or more workpieces may be produced at the same time as in the case where a right and left shoe last is to be manufactured. Such an apparatus will be described hereinafter.

In the embodiment illustrated in Figs. 1 and 2, a single carriage 15 is provided with a cutter head 18 directly connected to the shaft of a motor 19, the frame 20 of which is rigidly secured upon the carriage. The motor frame 20 may be provided with an additional chamber 21 within which another motor may be housed. The second motor may desirably be employed to perform a roughing cut simultaneously with the finishing cut performed by the head 18. The roughing cutter is not shown, but would be adapted to be received upon the shaft 22 shown projecting from the roughing motor frame.

A model wheel 23 is also mounted upon the carriage 15 desirably but not essentially vertically above the cutter head 18. The model wheel is of conventional construction having the identical form of the solid of revolution generated by the peripheral edges of the cutter blades upon the cutter head 18. Desirably the model wheel is adjustable along a line transverse to the ways 14. To provide for this adjustment the model wheel is mounted upon a slide 24 received and guided in an upwardly extending portion 25 of the casing 21. The axes of the model wheel and cuter head are spaced vertically the same distance as the axes of the model and workpiece.

The model and workpiece are driven simultaneously and in synchronism in any suitable manner. As shown herein the respective ends of the model and workpiece are engaged by driving dogs 26 and 27 which are secured upon the inner ends of shafts 28 and 29 which are journaled in a head stock frame 30 rigidly secured to a movable work frame 31. The other ends of the model and workpiece are supported by conventional tail stock centers 32 and 33 situated in parallel alignment with the shafts 28 and 29. The tail centers are axially adjustable within the tail stock frame 34 by means of the rotatable handles 35 and 36 thereby to cause the tail stock centers to firmly engage the right hand extremities of the model and workpiece respectively thus firmly supporting them within the apparatus. The tail stock frame 34 desirably is adjustable lengthwise along the bars 37 of the work frame 31, to provide for the reception of workpieces of various lengths.

The outer ends of the shafts 28 and 29 have secured thereon the gears 38 and 39. These gears are driven by means of a small pinion gear 40 secured upon a drive shaft 41 and meshing simultaneously with both gears 38 and 39. The shaft 41 is journaled in the head stock frame 30 and projects outward to receive a driving pulley 42 secured thereon. The pulley 42 is driven by a belt 43 which in turn is driven by a pulley 44 secured upon a short shaft 45 journaled in a bearing mounted on the left hand column 12. The inner end of the shaft 45 has secured thereon a pulley 46 which is driven from a pulley 47 fixed upon a shaft 48, by means of a belt 49. The shaft 48 is journaled at its ends in bearings mounted on the columns 12 of the main frame. In addition to the pulley 47 the shaft 48 has secured thereon a three step pulley 50 and a driving pulley 51 having a clutching mechanism 52 by means of which driving power may be transmitted to or disconnected from the model and workpiece. When the turning of the work-piece is completed the frame 31 is pulled forward to a locked position away from the cutter. This movement operates a bar 52a (Fig. 2) which throws the clutch 52 out of gear while the reverse movement connects the power to the model and work-piece.

The pulley 51 is constantly driven from a pulley 53 by a belt 54. The pulley 53 is secured upon a shaft 55 journaled in bearings mounted upon the legs 11 of the main frame. The shaft 55 has thereon a pulley 56 which in turn is driven by a motor 57 from a pulley 58 fixed upon the motor shaft. The pulley 56 is driven from a pulley 58 by means of a belt 59. The driving motor 57 may be mounted upon the frame in any desired manner. A suitable means of mounting the motor is to secure it upon a pivoted bracket in such manner that its own weight serves to maintain tension in the driving belt 59. The model and workpiece are thus rotated by power supplied from the motor 57 through the driving mechanism above described.

Means are provided for feeding the carriage 15 from power supplied by the motor 57. To accomplish this end a belt 60 passing over the pulley 50 also passes over a step pulley 61 fixed upon one end of a shaft 62 journaled in a bearing 63 secured to a leg 11 of the main frame. A pulley 64 has a driving connection with the pulley 65 secured upon a shaft 66 journaled at one end in a bearing 67 mounted upon a leg 11. A worm 68 is secured upon the other end of the shaft 66 which engages and drives a worm gear 69 rotatably mounted upon a stud shaft 70 fixed upon the main frame.

Motion of the worm gear 69 is transmitted to the carriage 15 by means of a chain 71. The chain is driven by a small sprocket 72 secured upon the gear wheel 69. The upper run of the chain 71 coming from the sprocket 72 passes over an idler and tension adjusting sprocket 73 from where it extends to the sprocket 74 rotatably mounted upon a stud shaft 75 secured upon the main frame adjacent the end of the ways 14. The sprocket 74 is so situated that the upper run of the chain as it leaves the sprocket is in line with the point of attachment of the chain to the carriage 15. Any suitable means will serve to connect the chain to the carriage. As shown herein the carriage is provided with a projection 76 (Fig. 2) extending forward from its base, upon the outer end of which is pivoted a connecting block 77. The two ends of the chain are secured to opposite ends of the block thereby transmitting movement of the chain to the carriage. The chain extends from the sprocket 74 to one end of the block 77 and from the other end of the block to another sprocket 78 rotatably mounted upon a stud shaft fixed upon the main frame adjacent the opposite end of the ways 14. From the sprocket 78 the chain extends back to the drive sprocket 72 thus completing the driving or feeding system for the carriage. By shifting the belt 60 from one step on the pulleys 50 and 61 to another step thereon various rates of feed for the carriage may be established.

In the operation of the machine the work frame 31 moves bodily parallel to the axes of the model and work-piece toward and from the model wheel and cutter head as the model wheel follows the contours of the model. The manner and means with which this motion of the work frame is controlled constitute an important feature of the invention. The frame 31 comprises the pair of bars 37 which are substantially of the same length as the width dimension of the bed 10. The bars are rigidly connected at their ends to a pair of end frame members 79. Desirably but not essentially the members 79 are upwardly extended having their extensions fastened to a pair of brackets 80 which are also secured to the upper bar 37. The brackets 80 provide additional rigidity to the frame 31 particularly against distortion in its own flatwise plane.

The weight of the frame 31 is supported by a pair of relatively long links 81 extending substantially vertically and pivoted at their lower extremities respectively to the members 79 of the frame 31 adjacent its end portions. The upper ends of the links are pivoted to the upper extremity of the columns 12 by means of brackets as shown. It is desirable that the frame thus supported be braced against sidewise motion. Any suitable means may be utilized for this purpose. One desirable method is illustrated wherein a rigid bar 82 extends between the columns 12. The end portions of the bar form the pivot shaft for the links 81. Stiffening bars 83 are rigidly anchored at their upper ends to a point adjacent the mid section of the bar 82 and extend downward at substantially a 45° angle and are rigidly anchored at their lower ends respectively to the links 81. Desirably means are provided to adjust the length of the links 81. Any suitable means may be employed for this purpose. As illustrated the links 81 are composed of two sections secured together by a tie plate 84 which is slidably attached to move relatively lengthwise with respect to one or both of the link sections. Screws 85 are provided for locking the plate and sections of the links rigidly in adjusted position. To expedite fine adjustment of the length of the links adjusting devices 86 (Fig. 2) are provided connecting the plate 84 and one section of the links 81. The entire weight of the work frame 31 is thus supported by the links 81 which also permit bodily forward and backward motion thereof.

The frame 31 must also be accurately and rigidly controlled in its movement to insure that its bodily motion forward and backward will take place without changing the angular position of the common plane in which the axes of the model and workpiece lie, that is, the various positions taken by the frame are parallel to each other. A novel means is provided for accomplishing this desired result is best shown in Fig. 2. A pair of rigid torque shafts 87 and 88 are rotatably mounted preferably at the back portion of the lathe with their axes lying in a plane parallel to the plane of the axes of the model and workpiece. The shaft 88 is mounted in bearings 89 fixed upon the lathe bed while the shaft 87 is mounted in bearings 90 rigidly secured to the backs of the columns 12. These bearings may be of the conventional cylindrical type but preferably are ball or roller bearings. The shafts 87 and 88 should be of substantial diameter of the order of two and one-half to three inches or more to provide maximum rigidity against torque forces.

The shaft 87 has rigidly fastened at its end portions a pair of arms 91 extending substantially vertically upward, while the shaft 88 has secured thereon a pair of similar vertical arms 92. A pair of horizontally positioned connecting links 93 and 94 are arranged in parallel alignment and pivotally connected to the outer ends respectively of one of the pairs of arms 91 and 92. The other ends of the links are pivoted to the upper and lower portion of the side frame member 79 of the work frame 31. Another pair of links 95 and 96 (Fig. 1) at the opposite side of the lathe are respectively pivoted upon the remaining arms 91 and 92 at one of their ends and at their other ends are pivoted to the other side frame member 79. All four links are exactly equal in length and disposed parallel with respect to each other.

The shaft 87 has secured thereto an arm 97 while the shaft 88 has secured thereto an arm 98. The arms 97 and 98 desirably project rearwardly from their respective shafts and are positioned in parallel alignment. The outer ends of these arms are pivotally tied together by a rigid link 99 equal in length to the distance between the axes of the shafts 87 and 88. It will be apparent that the frame 31 is thus positively guided in the manner required. The four corner portions are so connected together that they are forced to move in the same direction and with exactly the same velocity. A force tending to change the angular disposition of the frame 31 is directly met by the highly rigid torque shafts 87 and 88 through their interconnecting mechanism. In the operation of the mechanism it will be noted that the torque shaft stabilizing means above described adds substantially no weight to the work frame 31 and moreover only a very small amount of inertia is introduced thereby to the inherent inertia in the work frame 31. The design of the mechanism results in a very large reduction in the friction and inertia encountered in a conventional type of copying lathe. The action of the work frame is therefore, extremely sensitive in its response to the varying contours of the model which results in greater accuracy of operation and furthermore permits a higher speed of operation.

To maintain the necessary contact pressure between the model and model wheel any suitable means may be employed. A satisfactory arrangement is illustrated in the drawings wherein a short arm 100 is secured to the shaft 88 and has secured thereto one end of a tension spring 101 which is anchored at its other end to a bracket 102 secured upon the machine base. The spring may desirably be provided with means for adjusting its tension for example an eye bolt 103 passing through the bracket 102 and provided with an adjusting nut. The tension in the spring tends to rotate the shaft 88 which in turn acts through its interconnecting arms and links to move the work frame 31 toward the right in Fig. 2 thus resiliently urging the model into engagement with the model wheel. Slight rise and fall of the frame 31 due to the arcuate path of the pivotal connection 104a between the links 81 and the frame 31 does not alter the precise reproducing characteristics of the lathe since the torque shaft stabilizing means accurately maintains exact parallelisms and equal distances between the axes respectively of the model and model wheel and the cutter head and workpiece at all times. The model and workpiece rise and fall in very small but equal distances during the machine operation so that the reproducing accuracy of the lathe remains unchanged for all working positions of the frame 31.

In the operation of the apparatus shown in Figs. 1 and 2, the frame 31 is supported on the main frame by the relatively long links 81 pivoted to the bottom of the frame 31. The links are slightly back of a plane through the axes of the model and workpiece so that in the cutting range of movement of the frame 31, each pivot of the links thereto moves forward and back in substantially a straight line. The lower pivot points of the links 81 may form a slight arc, but this is almost negligible in the cutting range. In any case, the frame must move bodily forward and backward with respect to the main frame and the model wheel and cutters, because of the arrangement of the links 93 and 94 attached to the four corners of the flame. Since the links 93 and 94 are connected in a parallel motion system, the four corners of the frame 31 must move at the same time in the same direction and to the same extent. Therefore, regardless of any slight arc at the lower ends of the links 81, the frame 31 in any given position is always parallel to any other given position it may assume.

In the modified form of the invention is shown in Figs. 3 and 4 the main frame, the means for rotating the model and workpiece and the means for feeding the carriage are similar in construction to the corresponding elements above described in connection with the other form of the invention. The main difference between the two forms of the invention lies in the means employed to support the weight of the work frame 31. The links 81 described in connection with the other form of the invention are eliminated in the modified form to be described. The weight of the frame 31 is supported by a pair of horizontal floating levers 104 pivotally connected at their mid points to the lower portion of the side brackets 79 of the frame 31. The outer ends of the levers 104 are pivotally connected to pairs of substantially vertical links 105 and 106 which in turn are pivotally connected to fulcrum points upon the main frame. The links 105 are pivoted to brackets 107 rigidly secured to the columns 108 and 109 above the lever 104. The levers 106 are pivotally connected to plates 110 rigidly fastened to the end faces of the lathe bed 10 at points below the lever 104.

To improve the endwise stability of the above described guiding mechanism it may be desirable to tie together the pair of links 106. A suitable means for accomplishing this result is to provide a relatively rigid bar 111 fixed between the links 106. This bar may be cast integrally therewith or may be rigidly secured thereto. This modified form of suspending mechanism for the work frame 31 is extremely sensitive in operation and provides true straight line forward and backward motions of the work frame 31. The torque shafts 87 and 88 and their interconnecting arms and links function in the same manner as hereinbefore described in connection with Figs. 1 and 2.

It will be noted that the columns 108 and 109 differ somewhat in structure from the columns 12 described in connection with Figs. 1 and 2. The column 108 is relatively short and its upper end serves only to support the right bearing for the shaft 48 while the upper end of the column 109 serves only to support the bearing for the shaft 45, there being no necessity for supporting the upper end of weight supporting links 81 since in this form of the invention other means is provided therefor.

The operation of the apparatus shown in Figs. 3 and 4 is somewhat similar to that described above in connection with Figs. 1 and 2, although the work frame is supported by a substantially different means. In these figures, the same parallel motion arrangement is used as that used in Figs. 1 and 2. The work frame supporting means, including the symmetrically arranged links 105, 106 and the cross links 104, provide a novel arrangement by which the pivot point of the frame to the links 104 moves in a straight line. This straight line motion is provided because the arc formed by the movement of the link 105 is directly offset by the movement of the link 106. The backward and forward movement of the work frame in the cutting zone, in an apparatus of this type, is not very great, and the supporting means shown in Figs. 3 and 4 includes a novel pivoted arrangement for providing a straight line motion for the work frame. The work frame shown in Fig. 5 of the drawings is supported and operated similar to that of Figs. 3 and 4.

Fig. 5 of the drawings illustrates another application of the principles of the invention wherein the elements are arranged to produce a pair of lasts for right and left shoes simultaneously. The drawing is partially diagrammatic and illustrates only one of the many possible arrangements of parts. Only the work frame 112 carrying the model 113 and the two last blocks 114 and 115 is shown therein together with a conventional arrangement of model wheel carriage and cutter head carriage. The work frame 112 is provided with the same head stock 30 illustrated in Fig. 1, the two spindles of which are driven by the pulley 42 over which the belt 43 passes. The spindle 29 is provided with a dog 116 for engaging the heel of the model 113. The toe of the model is supported by a toe dog 117 having axial adjustment in a tail stock 118 rigidly secured to the cross bars 37.

The upper spindle 28 is extended and has a bearing in a head stock 119 rigidly secured to the cross bars 37. The elongated spindle 28 has secured thereto a block driving dog 120. The spindle 28 is also provided with a gear 121 secured rigidly thereto. The gear 121 meshes with the gear 122 of the same diameter mounted upon a spindle 123 journaled in the head stock 119. The spindle 123 has secured thereto a dog 124. The dogs 120 and 124 engage and drive last blocks 114 and 115 respectively which are supported at their opposite ends by dogs 125 and 126 axially adjustable in the tail stock 34 secured to the cross bar 37 and which is or may be identical to the tail stock shown in Fig. 1. The model 113 and the block 114 are thus driven in the same direction while the block 115 is driven in the opposite direction throughout the turning operation thus producing a right and a left last.

A conventional model wheel carriage 127 is adapted to travel upon the ways 14 upon the bed 10 and has mounted thereon a model wheel 128 which engages the model 113. Another carriage 129 also moves upon the ways 14 and has mounted thereon a pair of driven cutter heads 130 and 131 mounted upon the shafts of the motors 132 and 133 which are rigidly secured upon the carriage 129. The axes of the cutters are spaced apart the same distance as the axes of spindles 28 and 123 and are also situated in a plane parallel to the plane upon which the axes of the shafts 28 and 123 lie.

Desirably the two carriages are connected together by a conventional grading mechanism 134 by means of which various sizes of lasts may be produced from a single model. The work frame 112 in this form of the invention is supported and guided in its motion in the same manner as that of the work frame described in connection with Fig. 3 and Fig. 4 of the drawings.

The operation of this form of the invention is obvious. Due to the precision of movement of the frame 112 a perfect pair of lasts may be produced simultaneously from the model 113. The usual fan board mechanism and other conventional adjustments not shown may be provided.

We claim:

1. In a copying lathe including a main frame and a work holding frame supported thereon having means for holding and rotating a model and work piece, the improvement which comprises means for supporting said work frame including a pair of relatively long spaced links pivoted at one end upon said main frame and at their other ends upon said work frame, means for guiding said work frame including a pair of spaced parallel torque shafts rotatably mounted upon said main frame and disposed parallel to said work frame, means connecting said shafts to rotate them in synchronism, lateral extensions upon said shafts, and rigid connecting members interconnecting said lateral extensions with said work frame acting to constrain said work frame to move with a motion characterized as bodily movement at substantially a right angle to its general flatwise plane and without angular displacement from that plane.

2. In a copying lathe including a main frame and a work holding frame having means to support and drive a model and a work piece upon parallel axes, the improvement which comprises means to support the weight of said work holding frame and permit it to move toward and from a portion of the main frame, means to control the movement of said work frame as it moves toward and from said main frame including at least two relatively long spaced torque shafts rotatably mounted on said main frame, extending parallel to and for substantially the full length of said work frame, positive mechanical means to cause synchronized rotation of said torque shafts, at least two levers on each of said shafts extending laterally outward therefrom, and link members connecting the outer ends of said levers to said work frame thereby to cause said frame to move with a motion characterized as bodily movement transversely of its general flatwise plane and without angular displacement from that plane.

3. In a copying lathe including a main frame and a work supporting frame having means to support and rotate a model and work piece thereon, the improvement which comprises pivoted means extending between said work frame and said main frame acting to support the weight of said work frame and permit movement thereof toward and from a portion of the main frame, a pair of vertically spaced parallel torque members rotatably mounted on said main frame, means to cause them to rotate in synchronism, arms of equal length extending upwardly from said torque members and fixed thereto, link members connecting the ends of said arms to said work frame at substantially spaced points to maintain said work frame parallel to the plane of said torque members.

4. In a copying lathe including a main frame and a work holding frame having means to support and rotate a model and work piece therein, the improvement which comprises at least two supporting levers pivotally fastened to said work frame at their mid-point upon fulcrum points laterally separated a substantial distance upon said work frame, pairs of links of equal length pivotally connected at one of their ends to the outer ends of said supporting levers and pivoted at their other ends upon said main frame at points symmetrically disposed on opposite sides of said levers whereby the pivot points between said levers and said work frame are caused to travel in a straight line, means to guide said work frame to travel with a motion characterized as bodily movement transversely of its general flatwise plane and without angular displacement from that plane, said means including a pair of torque shafts having means to cause them to rotate in synchronism, and means interconnecting said torque shaft and said work frame operable to control the forward and backward motion of said work frame.

5. In a copying lathe including a main frame and a work holding frame having means to support and rotate a model and a work piece on separate axes, the improvement which comprises pivot means to support said work frame and permit movement thereof, means for guiding said work frame in a forward and backward motion including a pair of parallel torque shafts rotatably mounted in spaced relation upon said frame, means to cause said shafts to rotate in synchronism, and means interconnecting said torque shafts with said work frame to cause it to move forward and backward with a motion characterized by bodily movement transversely of its general flatwise plane without angular displacement from said plane.

6. In a copying lathe including a main frame and a work holding frame having means to support and rotate a model and work piece therein on separate parallel axes, the improvement which comprises at least two supporting levers pivotally fastened to said work frame at their mid-point upon fulcrum points laterally separated a substantial distance upon said work frame, pairs of links of equal length pivotally connected at one of their ends to the outer ends of said supporting levers and pivoted at their other ends upon said main frame at points symmetrically disposed on opposite sides of said levers whereby the pivot points between said levers and said work frame are caused to travel in a straight line, and a parallel motion guiding means mounted on said main frame and connected to said work holding frame by substantially spaced laterally extending rigid link members attached to each end of the work holding frame by end attachments, the link members having their other ends mechanically interconnected for concordant substantially axial movement, said parallel motion guiding means being adapted to guide said work frame in its movements and arranged to restrict said work holding frame to substantially a straight line body motion at a right angle to the plane of the work holding frame in the range of the cutting operation of the lathe.

7. In a copying lathe as defined by claim 3 in which means is attached to one of said torque members for causing rotation thereof and for urging the work-frame toward a portion of the main frame.

GEORGE CLAUSING.
CHARLES B. GARY.

REFERENCES CITED

The following references are of record in the file of this patent:

UNITED STATES PATENTS

| Number | Name | Date |
|---|---|---|
| 261,831 | Chopin | Aug. 1, 1882 |
| 460,699 | Autenrieth | Oct. 6, 1891 |
| 856,656 | Neudorff | June 11, 1907 |
| 968,672 | Loewer | Aug. 30, 1910 |
| 1,407,727 | Buck | Feb. 28, 1922 |
| 1,684,072 | Reed | Sept. 11, 1928 |
| 1,727,906 | Ryan | Sept. 10, 1929 |
| 1,733,207 | Ryan et al. | Oct. 29, 1929 |

FOREIGN PATENTS

| Number | Country | Date |
|---|---|---|
| 70,792 | Sweden | Apr. 4, 1928 |
| 288,301 | Great Britain | Jan. 17, 1929 |